United States Patent [19]

Arai

[11] Patent Number: 5,367,519
[45] Date of Patent: Nov. 22, 1994

[54] MULTIPLE ACCESS COMMUNICATION SYSTEM CAPABLE OF DECIDING A CONNECTION ROUTE AMONG A CENTRAL STATION, REPEATER STATIONS, AND TERMINAL STATIONS

[75] Inventor: Koju Arai, Tokyo, Japan
[73] Assignee: NEC Corporation, Tokyo, Japan
[21] Appl. No.: 133,266
[22] Filed: Oct. 7, 1993

Related U.S. Application Data

[63] Continuation of Ser. No. 842,648, Feb. 27, 1992, abandoned.

Foreign Application Priority Data

Feb. 27, 1991 [JP] Japan ................. 3-032563

[51] Int. Cl.$^5$ .............................. H04Q 11/04
[52] U.S. Cl. ......................... 370/60; 370/94.1
[58] Field of Search ............... 370/94.1, 94.2, 60, 370/60.1, 97, 95.3, 93, 85.5, 85.15

[56] References Cited

U.S. PATENT DOCUMENTS

| | | | |
|---|---|---|---|
| 4,079,209 | 3/1978 | Schwerdtel | 370/60 |
| 4,081,612 | 3/1978 | Hafner | 370/60 |
| 4,399,531 | 8/1983 | Grande et al. | 370/60 |
| 4,507,777 | 3/1985 | Tucker et al. | 370/85.15 |
| 5,003,533 | 3/1991 | Watanabe | 370/85.5 |
| 5,056,085 | 10/1991 | Vu | 370/60 |
| 5,130,977 | 7/1992 | May et al. | 370/60 |

*Primary Examiner*—Douglas W. Olms
*Assistant Examiner*—Chau T. Nguyen
*Attorney, Agent, or Firm*—Sughrue, Mion, Zinn, Macpeak & Seas

[57] ABSTRACT

In a multiple access communication system comprising a central station, at least one repeater station, and at least one terminal station, each of the central, the repeater, and the terminal stations has each station number. The central station transmits a central downward signal comprising a central number signal representative of the station number of the central station to the repeater station. The repeater station separates the central number signal from the central downward signal. The repeater station transmits a repeater downward signal comprising a repeater number signal representative of the station number of the repeater station to the terminal station. The terminal station separates the repeater number signal from the repeater downward signal as a separated repeater number signal. The terminal station transmits an upward signal to the repeater station. The upward signal comprises the separated repeater number signal and a terminal number signal representative of the station number of the terminal station. The repeater station receives the upward signal and transmits to the central station a central upward signal which comprises the central and the repeater number signals, and the separated and the terminal number signals. A central processor (106) carries out a process operation by the use of a combination of the central and the repeater number signals and a combination of the separated and the terminal number signals.

3 Claims, 3 Drawing Sheets

MULTIPLE ACCESS COMMUNICATION SYSTEM CAPABLE OF DECIDING A CONNECTION ROUTE AMONG A CENTRAL STATION, REPEATER STATIONS, AND TERMINAL STATIONS

This is a continuation of application No. 07/842,648, now abandoned filed Feb. 27, 1992, abandoned.

BACKGROUND OF THE INVENTION

This invention relates to an administration system of a multiple access communication system, such as a time division multiple access communication system. Such a multiple access communication system is particularly useful for a time division telephone system.

Such a multiple access communication system comprises a central or a base station, a terminal station remote from the central station, and at least one repeater station placed between the central station and the terminal station. The terminal station is communicable with the central station directly or through at least one repeater station. The repeater station is communicable with the central station directly or through another repeater station. In such a multiple access communication system, it is required that the central station administers construction of the system for carrying out a predetermined process, such as an accounting process. For example, the construction of the system is represented in the form of a route map or a connection route among the central station, the repeater station, and the terminal station.

Hitherto, the connection route is registered in the central station by an operator. In this event, the operator must reregister the connection route whenever the system has an extension repeater station or an extension terminal station.

SUMMARY OF THE INVENTION

It is therefore an object of this invention to provide a multiple access communication system which is capable of automatically deciding a connection route among a central station, repeater stations, and terminal stations.

Other objects of this invention will become clear as the description proceeds.

On describing the gist of this invention, it is possible to understand that a multiple access communication system comprises a central station, at least one repeater station, and at least one terminal station. Each of the central station, the at least one repeater station, and the at least one terminal station has each its own station number. The central station transmits a central downward signal to the repeater station that immediately succeeds to the central station and receives a central upward signal from the repeater station. The repeater station is for repeating the central downward signal from the central station to the terminal station and for transmitting a repeater upward signal as the central upward signal to the central station. The central upward signal comprises a number signal representative of each of the station numbers.

According to this invention, the central station comprises (a) a central number signal generating circuit for generating a central number signal representative of the station number that is assigned to the central station, (b) a central multiplexer supplied with a central transmission data signal representative of central transmission data and connected to the central number signal generating circuit for multiplexing the central transmission data signal and the central number signal into a central multiplexed signal to produce the central multiplexed signal as the central downward signal, (c) a central separating circuit for separating the number signal from the central upward signal as a separated number signal, and (d) processing means connected to the central separating circuit for carrying out a predetermined process operation by the use of the separated number signal to decide a connection route from the central station to the terminal station.

The repeater station receives a first repeater downward signal from a preceding station that immediately precedes the repeater station and transmits a second repeater downward signal to a succeeding station that immediately succeeds to the repeater station. The repeater station further receives a first repeater upward signal from the succeeding station and transmits a second repeater upward signal to the preceding station. The first repeater downward signal comprises a preceding number signal representative of the station number which is assigned to the preceding station. The repeater station comprises (e) a repeater signal generating circuit for generating a repeater number signal representative of the station number that is assigned to the repeater station, (f) a first repeater multiplexer supplied with the first repeater downward signal and connected to the repeater signal generating circuit for multiplexing the first repeater downward signal and the repeater number signal into a first repeater multiplexed signal to produce the first repeater multiplexed signal as the second repeater downward signal, (g) a repeater separating circuit for separating the preceding number signal from the first repeater downward signal as a separated preceding number signal, and (h) a second repeater multiplexer supplied with the first repeater upward signal and connected to the repeater signal generating circuit and the repeater separating circuit for multiplexing the first repeater upward signal, the repeater number signal, and the separated preceding number signal into a second repeater multiplexed signal to produce the second repeater multiplexed signal as the second repeater upward signal.

The terminal station receives a terminal downward signal from the repeater station that immediately precedes the terminal station and transmits a terminal upward signal to the repeater station. The terminal downward signal comprises a repeater number signal representative of the station number which is assigned to the repeater station. The terminal station comprises (i) a terminal separating circuit for separating the repeater number signal from the terminal downward signal as a separated repeater number signal, (j) a terminal number signal generating circuit for generating a terminal number signal representative of the station number that is assigned to the terminal station, and (k) a terminal multiplexer supplied with a terminal transmission data signal representative of terminal transmission data and connected to the terminal number signal generating circuit and the terminal separating circuit for multiplexing the terminal transmission data signal, the terminal number signal, and the separated repeater number signal into a terminal multiplexed signal to produce the terminal multiplexed signal as the terminal upward signal.

DESCRIPTION OF THE PREFERRED EMBODIMENT

Figure 1:
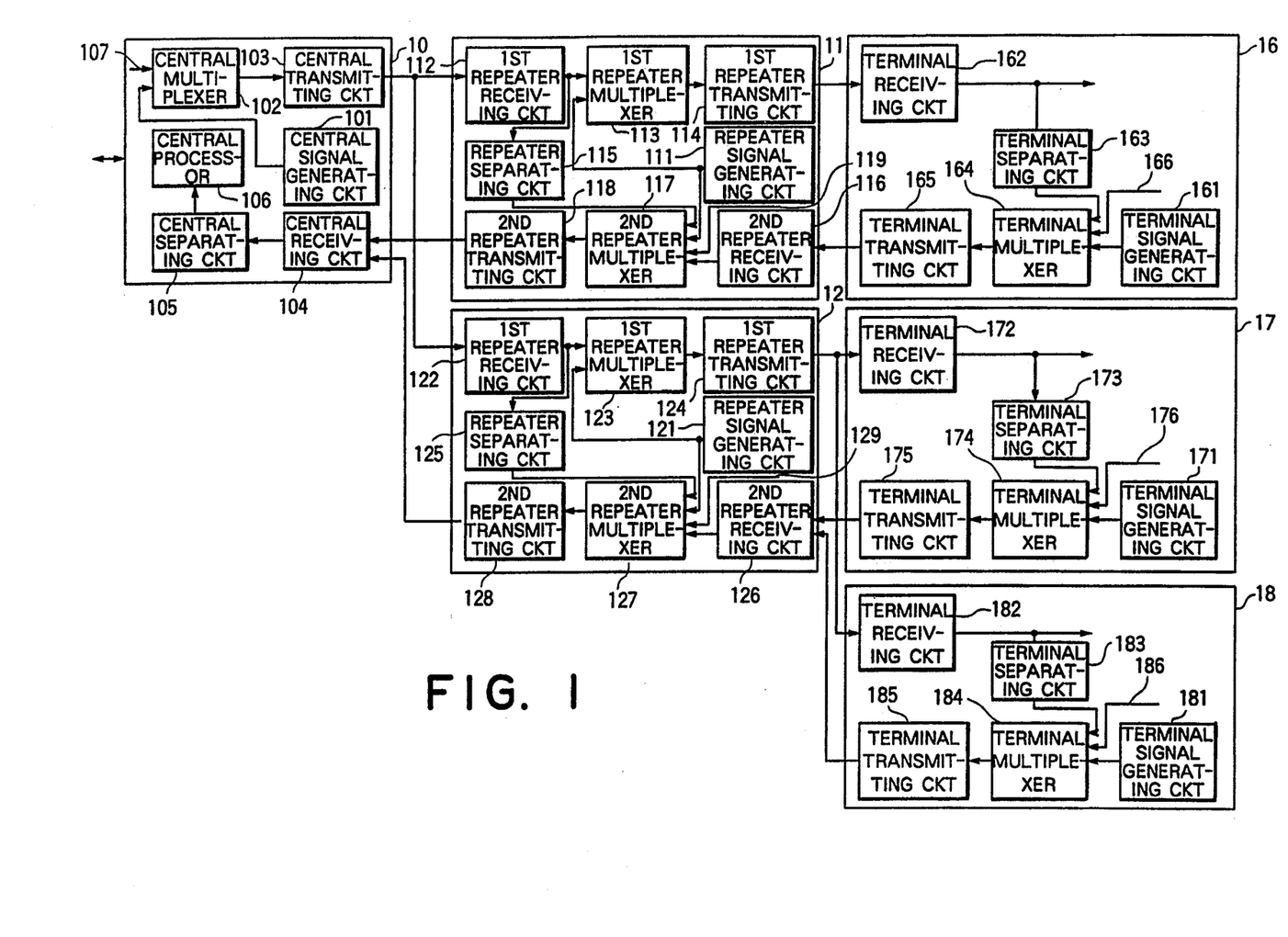
FIG. 1 is a block diagram of a multiple access communication system according to a preferred embodiment of this invention.
Figure 2:
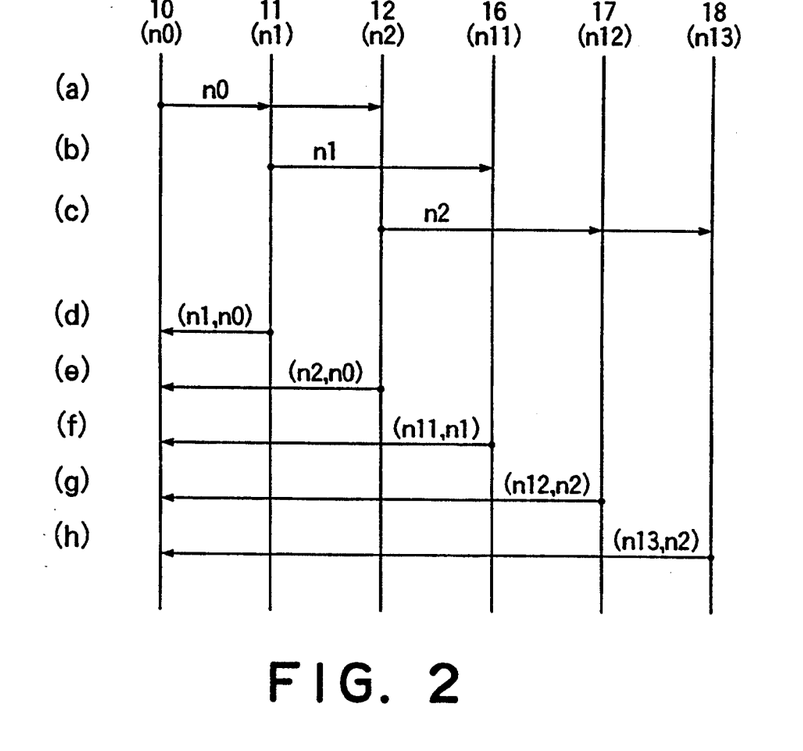
FIG. 2 is an illustration for use in describing operation of the multiple access communication system illustrated in FIG. 1.

Referring to FIGS. 1 and 2, the description will be made as regards a multiple access communication system, such as a time division multiple access communication system, which is particularly useful for a time division telephone system. The system comprises a central or a base station 10 connected to an exchange station (not shown), first and second repeater stations 11 and 12, and first through third terminal stations 16, 17, and 18. The central station 10 is communicable with the first and the second repeater stations 11 and 12 through downward and upward transmission paths which are symbolically illustrated by real lines between the central station 10 and the first and the second repeater stations 11 and 12. Namely, the central station 10 transmits a central downward signal to the first and the second repeater stations 11 and 12 through the downward transmission path and receives a central upward signal from the first and the second repeater stations 11 and 12 through the upward transmission path.

The first repeater station 11 is communicable with the first terminal station 16 through the downward and the upward transmission paths. The second repeater station 12 is communicable with the second and the third terminal stations 17 and 18 through the downward and the upward transmission paths. For example, the first repeater station 11 is for repeating the central downward signal from the central station 10 to the first terminal station 16 and for transmitting a repeater upward signal as the central upward signal to the central station 10. Thus, the central station 10 is communicable with the first terminal station 16 through the first repeater station 11. Similarly, the central station 10 is communicable with the second and the third terminal stations 17 and 18 through the second repeater station 12. Each of the downward and the upward transmission paths may utilize either a radio communication path or a wire communication path.

Each of the central station 10, the first and the second repeater stations 11 and 12, and the first through the third terminal stations 16 to 18 has each station number. In the example being illustrated, the central station 10, the first and the second repeater stations 11 and 12 have station numbers n0, n1, and n2, respectively. The first through the third terminal stations 16 to 18 have the station numbers n11, n12, and n13, respectively. As will become clear as the description proceeds, the central upward signal comprises a number signal representative of each of the station numbers.

The central station 10 comprises a central signal generating circuit 101, a central multiplexer 102, a central transmitting circuit 103, a central receiving circuit 104, a central separating circuit 105, and a central processor 106. In order to transmit a data signal representative of central transmission data, the central station 10 further comprises a central data output section (not shown) for producing the data signal. The data signal is supplied to the central multiplexer 102 through a signal line 107 and is called a central transmission data signal hereinafter. The central signal generating circuit 101 is for generating a central number signal representative of the station number n0 that is assigned to the central station 10. The central number signal is supplied to the central multiplexer 102. Supplied with the central transmission data signal and the central number signal, the central multiplexer 102 multiplexes the central transmission data signal and the central number signal into a central multiplexed signal and supplies the central multiplexed signal to the central transmitting circuit 103. In order to communicate with one of the first and the second repeater stations 11 and 12 and the first through the third terminal stations 16 to 18, the central transmitting circuit 103 transmits the central multiplexed signal to either the first repeater station 11 or the second repeater station 12 as the central downward signal. The central downward signal comprises the central number signal representative of the station number n0 as shown in FIG. 2(a).

The central receiving circuit 104 receives the central upward signal as a received central upward signal from one of the first and the second repeater stations 11 and 12 and supplies the received central upward signal to the central separating circuit 105. The central separating circuit 105 is for separating the number signal from the received central upward signal as a separated number signal and delivers the separated number signal to the central processor 106. The central processor 106 carries out a predetermined process operation by the use of the separated number signal in the manner which will later be described more in detail.

The first repeater station 11 comprises a repeater signal generating circuit 111, a first repeater receiving circuit 112, a first repeater multiplexer 113, a first repeater transmitting circuit 114, a repeater separating circuit 115, a second repeater receiving circuit 116, a second repeater multiplexer 117, and a second repeater transmitting circuit 118. Like the first repeater station 11, the second repeater station 12 comprises a repeater signal generating circuit 121, a first repeater receiving circuit 122, a first repeater multiplexer 123, a first repeater transmitting circuit 124, a repeater separating circuit 125, a second repeater receiving circuit 126, a second repeater multiplexer 127, and a second repeater transmitting circuit 128.

The first repeater station 11 receives the central downward signal as a first repeater downward signal from the central station 10, namely, a preceding station, and transmits a second repeater downward signal to the first terminal station, namely, a succeeding station. The first repeater station 11 receives a first repeater upward signal from the first terminal station 16 and transmits a second repeater upward signal to the central station 10. As mentioned in relation to the central station 10, the first repeater downward signal, namely, the central downward signal, comprises the central number signal representative of the station number n0 assigned to the central station 10.

The first repeater receiving circuit 112 receives the first repeater downward signal as a first received downward signal and supplies the first received downward signal to the first repeater multiplexer 113 and the repeater separating circuit 115. The repeater signal generating circuit 111 is for generating a first repeater number signal representative of the station number n1 that is assigned to the first repeater station 11. The first repeater number signal is supplied to the first and the second repeater multiplexers 113 and 117. Supplied with the first received downward signal and the first repeater number signal, the first repeater multiplexer 113 multiplexes the first received downward signal and the first repeater number signal into a first repeater multiplexed signal. The first repeater multiplexer 113 delivers the first repeater multiplexed signal to the first repeater transmitting circuit 114. The first repeater transmitting circuit 114 transmits the first repeater multiplexed signal to the first terminal station 16 as the second repeater downward signal. The second repeater downward signal transmitted from the first repeater station 11 comprises the first repeater number signal representative of the station number n1 as shown in FIG. 2(b).

In the second repeater station 12, the repeater signal generating circuit 121 generates a second repeater number signal representative of the station number n2 that is assigned to the second repeater station 12. In the manner mentioned in conjunction with the first repeater station 11, the first repeater transmitting circuit 124 transmits the second repeater downward signal to either the second terminal station 17 or the third terminal station 18. The second repeater downward signal transmitted from the second repeater station 12 comprises the second repeater number signal representative of the station number n2 as shown in FIG. 2(c).

Turning back to the first repeater station 11, the second repeater receiving circuit 116 receives the first repeater upward signal as a first received upward signal and delivers the first received upward signal to the second repeater multiplexer 117. The repeater separating circuit 115 is for separating the central number signal from the first received downward signal as a separated central number signal. In the example, the separated central number signal represents the station number n0. The separated central number signal is supplied to the second repeater multiplexer 117.

In order to transmit a data signal representative of repeater transmission data, the first repeater station 11 further comprises a repeater data output section (not shown) for producing the data signal. The data signal is supplied to the second repeater multiplexer 117 through a signal line 119 and is called a first repeater transmission data signal hereinafter. The second repeater multiplexer 117 is supplied with the first received upward signal from the second repeater receiving circuit 116. The second repeater multiplexer 117 is further supplied with the first repeater number signal and the separated central number signal from the repeater signal generating circuit 111 and the repeater separating circuit 115, respectively, together with the first repeater transmission data signal. The second repeater multiplexer 117 multiplexes the first received upward signal, the first repeater number signal, the separated central number signal, and the first repeater transmission data signal into a second repeater multiplexed signal and delivers the second repeater multiplexed signal to the second repeater transmitting circuit 118. The second repeater transmitting circuit 118 transmits the second repeater multiplexed signal to the central station 10 as the second repeater upward signal. For convenience, the second repeater upward signal transmitted from the first repeater station 11 will be called a primary second repeater upward signal. The primary second repeater upward signal comprises the separated central number signal representative of the station number n0 and the first repeater number signal representative of the station number n1 as shown in FIG. 2(d). The separated central number signal and the repeater number signal may collectively be called a number signal.

In the second repeater station 12, the repeater separating circuit 125 separates the central number signal from the first received downward signal as the separated central number signal. The separated central number signal is supplied to the second repeater multiplexer 127. The second repeater multiplexer 127 is supplied with the first received upward signal from the second repeater receiving circuit 126. The second repeater multiplexer 127 is further supplied with the second repeater number signal and the separated central number signal from the repeater signal generating circuit 121 and the repeater separating circuit 125, respectively, together with a second repeater transmission data signal supplied through a signal line 129 from a repeater data output section (not shown) included in the second repeater station 12. The second repeater multiplexer 127 multiplexes the first received upward signal, the second repeater number signal, the separated central number signal, and the second repeater transmission data signal into the second repeater multiplexed signal and delivers the second repeater multiplexed signal to the second repeater transmitting circuit 128. The second repeater transmitting circuit 128 transmits the second repeater multiplexed signal to the central station 10 as the second repeater upward signal. The second repeater upward signal transmitted from the second repeater station 12 comprises the separated central number signal representative of the station number n0 and the second repeater number signal representative of the station number n2 as shown in FIG. 2(e).

In addition, when the second repeater station 12 transmits the second repeater upward signal in response to the first repeater upward signal transmitted from the second terminal station 17, the second repeater upward signal transmitted from the second repeater station 12 will be called a secondary second repeater upward signal. When the second repeater station 12 transmits the second repeater upward signal in response to the first repeater upward signal transmitted from the third terminal station 18, the second repeater upward signal transmitted from the second repeater station 12 will be called a tertiary second repeater upward signal.

The first terminal station 16 comprises a terminal signal generating circuit 161, a terminal receiving circuit 162, a terminal separating circuit 163, a terminal multiplexer 164, and a terminal transmitting circuit 165. Like the first terminal station 16, the second terminal station 17 comprises a terminal signal generating circuit 171, a terminal receiving circuit 172, a terminal separating circuit 173, a terminal multiplexer 174, and a terminal transmitting circuit 175. The third terminal station 18 comprises a terminal signal generating circuit 181, a terminal receiving circuit 182, a terminal separating circuit 183, a terminal multiplexer 184, and a terminal transmitting circuit 185.

The first terminal station 16 receives the second repeater downward signal as a received terminal downward signal from the first repeater station 16, namely, a preceding station that immediately precedes the first terminal station 16. The first terminal station 16 transmits a terminal upward signal to the first repeater station 11. The terminal separating circuit 161 is for separating the first repeater number signal from the received terminal downward signal as a first separated repeater number signal. In the example, the first separated repeater number signal represents the station number n1. The first separated repeater number signal is supplied to the terminal multiplexer 164. The terminal signal generating circuit 161 is for generating a first terminal number signal representative of the station number n11 that is assigned to the first terminal station 16. The first terminal number signal is supplied to the terminal multiplexer 164.

In order to transmit a data signal representative of terminal transmission data, the first terminal station 16 further comprises a terminal data output section (not shown) for producing the data signal. The data signal is supplied to the terminal multiplexer 164 through a signal line 166 and is called a first terminal transmission data signal hereinafter. When the first terminal station 16 transmits the first terminal transmission data signal, the terminal multiplexer 164 is supplied with the first separated repeater number signal and the first terminal number signal together with the first terminal transmission data signal. The terminal multiplexer 164 multiplexes the first terminal transmission data signal, the first separated repeater number signal, and the first terminal number signal into a terminal multiplexed signal and delivers the terminal multiplexed signal to the terminal transmitting circuit 165. The terminal transmitting circuit 165 transmits the terminal multiplexed signal to the first repeater station 11 as the first terminal upward signal. The first terminal upward signal transmitted from the first terminal station 16 comprises the first separated repeater number signal representative of the station number n1 and the first terminal number signal representative of the station number n11 as shown in FIG. 2(f).

It is to be noted here that the first terminal upward signal transmitted from the first terminal station 16 is included in the primary second repeater upward signal transmitted from the first repeater station 11 as mentioned in conjunction with the first repeater station 11. Therefore, the primary second repeater upward signal comprises the first separated repeater number signal representative of the station number n1 and the first terminal number signal representative of the station number n11 in addition to the separated central number signal representative of the station number n0 and the first repeater number signal representative of the station number n1.

In the second terminal station 17, the terminal separating circuit 173 separates the second repeater number signal from the received terminal downward signal as a second separated repeater number signal. In the example, the second separated repeater number signal represents the station number n2 that is assigned to the second repeater station 12. The terminal multiplexer 174 is supplied with the second separated repeater number signal from the terminal separating circuit 173 and is supplied with a second terminal number signal from the terminal signal generating circuit 171. The second terminal number signal represents the station number n12 that is assigned to the second terminal station 17. Furthermore, the terminal multiplexer 174 is supplied with a second terminal transmission data signal through a signal line 176 from a terminal data output section (not shown) included in the second terminal station 17. The terminal multiplexer 174 delivers a second terminal multiplexed signal to the terminal transmitting circuit 175. The terminal transmitting circuit 175 transmits the second terminal multiplexed signal to the second repeater station 12 as the first repeater upward signal. The first repeater upward signal transmitted from the second terminal station 17 comprises the second separated repeater number signal representative of the station number n2 and the second terminal number signal representative of the station number n12 as shown in FIG. 2(g).

When the second repeater station 12 transmits the secondary second repeater upward signal in response to the first terminal upward signal transmitted from the second terminal station 17, the secondary second repeater upward signal includes the first terminal upward signal transmitted from the second terminal station 17. In this event, the secondary second repeater upward signal comprises the second separated repeater number signal representative of the station number n2 and the second terminal number signal representative of the station number n12 in addition to the separated central number signal representative of the station number n0 and the second repeater number signal representative of the station number n2.

In the third terminal station 18, the terminal separating circuit 183 separates the second repeater number signal from the received terminal downward signal as the second separated repeater number signal. The terminal multiplexer 184 is supplied with the second separated repeater number signal from the terminal separating circuit 183 and is supplied with a third terminal number signal from the terminal signal generating circuit 181. The third terminal number signal represents the station number n13 that is assigned to the third terminal station 18. Furthermore, the terminal multiplexer 184 is supplied with a third terminal transmission data signal through a signal line 186 from a terminal data output section (not shown) included in the third terminal station 18. The terminal multiplexer 184 delivers a third terminal multiplexed signal to the terminal transmitting circuit 185. In the manner mentioned above, the terminal transmitting circuit 185 transmits the third terminal multiplexed signal to the second repeater station 12 as the first repeater upward signal. The first repeater upward signal transmitted from the third terminal station 18 comprises the second separated repeater number signal representative of the station number n2 and the third terminal number signal representative of the station number n13 as shown in FIG. 2(h).

When the second repeater station 12 transmits the tertiary second repeater upward signal in response to the first terminal upward signal transmitted from the third terminal station 18, the tertiary second repeater upward signal includes the first terminal upward signal transmitted from the third terminal station 18. In this event, the tertiary second repeater upward signal comprises the second separated repeater number signal representative of the station number n2 and the third terminal number signal representative of the station number n13 in addition to the separated central number signal representative of the station number n0 and the second repeater number signal representative of the station number n2.

In the central station 10, the central receiving circuit 104 receives the primary second repeater upward signal transmitted from the first repeater station 11 as a primary received central upward signal. The central separating circuit 105 separates the separated central number signal representative of the station number n0 and the first repeater number signal representative of the station number n1 from the primary received central upward signal. The central separating circuit 105 further separates the first separated repeater number signal representative of the station number n1 and the first terminal number signal representative of the station number n11 from the primary received central upward signal. A combination of the station number n0 and the station number n1 is called a first pair and is supplied to the central processor 106. A combination of the station number n1 and the station number n11 is called a second pair and is supplied to the central processor 106.

The central receiving circuit 104 further receives the secondary second repeater upward signal transmitted from the second repeater station 12 as a secondary received central upward signal. The central separating circuit 105 separates the separated central number signal representative of the station number n0 and the second repeater number signal representative of the station number n2 from the secondary received central upward signal. The central separating circuit 105 further separates the second separated repeater number signal representative of the station number n2 and the second terminal number signal representative of the station number n12 from the secondary received central upward signal. A combination of the station number n0 and the station number n2 is called a third pair and is supplied to the central processor 106. A combination of the station number n2 and the station number n12 is called a fourth pair and is supplied to the central processor 106.

The central receiving circuit 104 still further receives the tertiary second repeater upward signal transmitted from the second repeater station 12 as a tertiary received central upward signal. The central separating circuit 105 separates the second separated repeater number signal representative of the station number n2 and the third terminal number signal representative of the station number n13 from the tertiary received central upward signal in addition to the separated central number signal representative of the station number n0 and the second repeater number signal representative of the station number n2. A combination of the station number n2 and the station number n13 is called a fifth pair and is supplied to the central processor 106. Abovementioned first through the fifth pairs are illustrated in FIG. 3(a).

Figure 3:
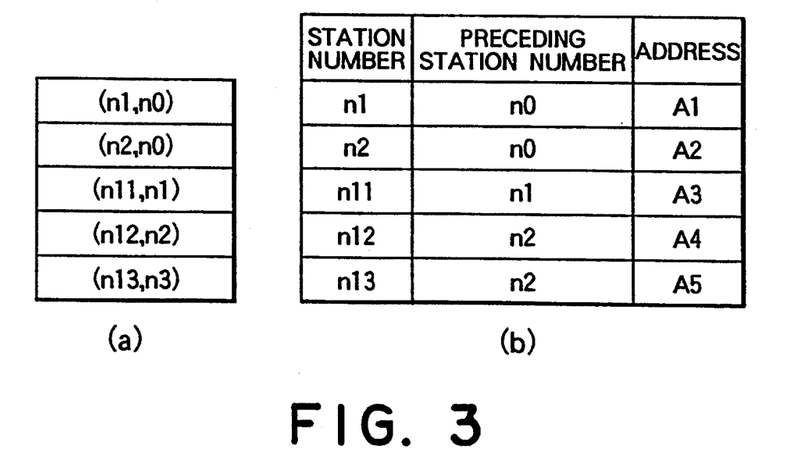
FIG. 3 is an illustration for use in describing number signals transmitted from the respective stations illustrated in FIG. 1.
Figure 4:
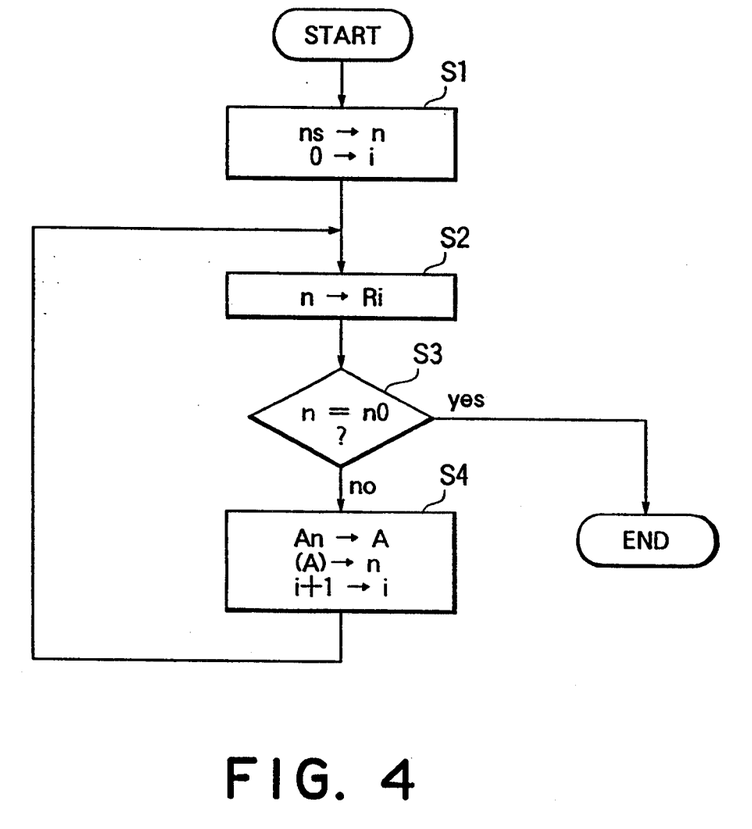
FIG. 4 is a flow chart for use in describing operation of a central processor illustrated in FIG. 1.

Referring to FIGS. 3 and 4, the central processor 106 carries out the predetermined process operation by the use of the first through the fifth pairs in order to decide a route map or a connection route among the central station 10, the first and the second repeater stations 11 and 12, and the first through the third terminal stations 16 to 18. The central processor 106 is implemented by a CPU (central processing unit).

The central processor 106 comprises a processor memory (not shown) for memorizing the station numbers of the preceding stations, in accordance with the separated central number signal and the separated repeater number signal which are supplied from the central separating circuit 105, each of which precedes each of the first and the second repeater stations 11 and 12 and the first through the third terminal stations 16 to 18. As mentioned before, the central station 10 immediately precedes each of the first and the second repeater stations 11 and 12. The first repeater station 11 immediately precedes the first terminal station 16. The second repeater station 12 immediately precedes the second and the third terminal stations 17 and 18. Under the circumstances, the processor memory memorizes the station numbers of the preceding stations at first through fifth addresses A1, A2, A3, A4, and A5 in one-to-one correspondence to the station numbers n1, n2, n11, n12, and n13.

In the example being illustrated, the processor memory memorizes the station number n0 as a first memorized preceding station number at the first address A1. The processor memory memorizes the station number n0 as a second memorized preceding station number at the second address A2. The station number n1 is memorized at the third address A3 as a third memorized preceding station number. The station number n2 is memorized at the fourth address A4 as a fourth memorized preceding station number. The station number n2 is memorized at the fifth address A5 as a fifth memorized preceding station number.

In order to decide the connection route from the central station 10 to one of the first through the third terminal stations 16 to 18, the central processor 106 carries out the following operation.

At a first step S1, a variable n is set at a station number ns, for example, n11, where ns represents the station number to be decided. Simultaneously, a variable i is set at zero where i represents the number of the stations included in the connection route from the terminal station having the station number ns to the central station 10. Such a number of the stations will be called a repeating stage number. At a second step S2, the variable n is placed as a variable Ri where Ri represents the station number.

At a third step S3, the central processor 106 decides whether or not the variable Ri is coincident with the station number n0. If the variable Ri is coincident with the station number n0, the operation is completed. When the variable Ri does not coincide with the station number n0, the operation proceeds to a fourth step S4.

At the fourth step S4, the central processor 106 searches an address An corresponding to the station number ns by referring to the processor memory and substitutes the address An for a variable A. Subsequently, the central processor 106 searches the station number of the preceding station which immediately precedes the terminal station having the station number ns by referring to a content of the address indicated by the variable A. The central processor 106 substitutes the station number of the preceding station for the variable n. Furthermore, the central processor 106 adds one to the variable i. Then, the operation turns back to the second step S2.

The second through the fourth steps S2 to S4 are repeated until the variable Ri is coincident with the station number n0.

Let the central processor 106 decide the connection route from the central station 10 to the first terminal station 16 having the station number n11. At the first step S1, the variable n is set at n11. Simultaneously, the variable i is set at zero. At the second step S2, the variable n11 is placed as a variable R0.

At the third step S3, the central processor 106 decides whether or not the variable R0, namely, the variable n11 is coincident with the station number n0. In the example, the third step S3 is succeeded by the fourth step S4 because the variable n11 does not coincident with the station number n0.

At the fourth step S4, the central processor 106 searches the third address A3 corresponding to the station number n11 by referring to the processor memory and substitutes the third address A3 for the variable A. Subsequently, the central processor 106 searches the station number of the preceding station which immediately precedes the first terminal station 16 by referring to the content of the third address A3 indicated by the variable A. The processor memory has the third memorized preceding station number, namely, the station number n1 at the third address A3 as illustrated in FIG. 3(b). The central processor 106 substitutes the station number n1 for the variable n. Furthermore, the central processor 106 changes the variable i from zero to one. Then, the operation turns back to the second step S2.

At the second step S2, the variable n is placed as a variable R1.

At the third step S3, the central processor 106 decides whether or not the variable R1, namely, the station number n1 is coincident with the station number n0. As a result of decision operation, the third step S3 is succeeded by the fourth step S4 because the station number n1 does not coincide with the station number n0.

At the fourth step S4, the central processor 106 searches the first address A1 corresponding to the station number n1 by referring to the processor memory and substitutes the first address A1 for the variable A. Subsequently, the central processor 106 searches the station number of the preceding station which immediately precedes the first repeater station 11 by referring to the content of the first address A1. The processor memory has the first memorized preceding station number, namely, the station number n0 at the first address A1 as illustrated in FIG. 3(b). The central processor 106 substitutes the station number n0 for the variable n. Furthermore, the central processor 106 changes the variable i from one to two. Then, the operation turns back to the second step S2.

At the second step S2, the variable n is placed as a variable R2. At the third step S3, the central processor 106 decides whether or not the variable R2, namely, the station number n0 is coincident with the station number n0. As a result of decision operation, the operation is completed because the variable R2 is coincident with the station number n0. Thus, the central processor 106 can decide the connection route and the repeating stage number. In the example, the connection route is represented by the variable R0, namely, the station number n11 (first terminal station 16), the variable R1, namely, the station number n1 (first repeater station 11), and the variable R2, namely, the station number n0 (central station 10), in order from a least significant station. The repeating stage number is represented by the variable i. In the example, the repeating stage number is equal to two. In the manner mentioned above, the central processor 106 can decide the repeating stage number and the connection route from the central station 10 to the second terminal station 17 and decide the repeating stage number and the connection route from the central station 10 to the third terminal station 18. In other words, the central processor 106 can decide the fact that the first and the second repeater stations 11 and 12 belong to the central station 10 and that the first terminal station 16 belongs to the first repeater station 11 while the second and the third terminal stations 17 and 18 belong to the second repeater station 12.

This invention is particularly useful for a predetermined process, such as an accounting process of a telephone system. For example, an account is changeable in accordance with the repeating stage number.

While this invention has thus far been described only in conjunction with a preferred embodiment thereof, it will readily be possible for those skilled in the art to put this invention into practice in various other manners.

What is claimed is:

1. A multiple access communication system comprising a central station having a central station number, at least one repeater station having a repeater station number, and a plurality of terminal stations which have terminal station numbers, each of said central station, said at least one repeater station, and said plurality of terminal stations having a different respective station number, said central station transmitting a central downward signal to said at least one repeater station that immediately succeeds said central station and receiving a central upward signal from said at least one repeater station, said at least one repeater station being for repeating said central downward signal from said central station to said plurality of terminal stations and for transmitting a repeater upward signal as said central upward signal to said central station, said central downward signal comprising a central number signal representative of said central station number that is assigned to said central station, said central upward signal comprising said central number signal and a repeater number signal representative of said repeater station number that is assigned to said at least one repeater station, each of said plurality of terminal stations receiving a repeater downward signal comprising said repeater number signal representative of said repeater station number that is assigned to said at least one repeater station which immediately precedes said each of the plurality of terminal stations, each of said plurality of terminal stations respectively transmitting a terminal upward signal comprising said repeater number signal and a terminal number signal representative of said terminal station number that is respectively assigned to each of said plurality of terminal stations, said at least one repeater station repeating said terminal upward signal specified by each of said plurality of terminal stations from each of said plurality of terminal stations to said central station, said central station comprising:

a central number signal generating circuit for generating said central number signal;

a central multiplexer supplied with a central transmission data signal representative of central transmission data and connected to said central number signal generating circuit for multiplexing said central transmission data signal and said central number signal into a central multiplexed signal to transmit said central multiplexed signal to said at least one repeater station as said central downward signal;

a central separating circuit for separating a first pair of said central number signal and said repeater number signal from said central upward signal and separating a second pair of said repeater number signal and said terminal number signal from said terminal upward signal received through said at least one repeater station; and processing means connected to said central separating circuit for carrying out a predetermined process operation by the use of said first and said second pairs to decide a connection route among said central station, said at least one repeater station, and said plurality of terminal stations.

2. A multiple access communication system as claimed in claim 1, wherein said at least one repeater station comprises:
- a repeater signal generating circuit for generating said repeater number signal;
- a first repeater multiplexer supplied with said central downward signal and connected to said repeater signal generating circuit for multiplexing said central downward signal and said repeater number signal into said repeater downward signal;
- a repeater separating circuit for separating said central number signal from said central downward signal as a separated central number signal; and
- a second repeater multiplexer supplied with said terminal upward signal and connected to said repeater signal generating circuit and said repeater separating circuit for multiplexing said terminal upward signal, said repeater number signal, and said separated central number signal into said central upward signal.

3. A multiple access communication system as claimed in claim 1, wherein each of said plurality of terminal stations comprises:
- a terminal separating circuit for separating said repeater number signal from said repeater downward signal as a separated repeater number signal;
- a terminal number signal generating circuit for generating said terminal number signal; and
- a terminal multiplexer supplied with a terminal transmission data signal representative of terminal transmission data and connected to said terminal number signal generating circuit and said terminal separating circuit for multiplexing said terminal transmission data signal, said terminal number signal, and said separated repeater number signal into said terminal upward signal.

* * * * *